United States Patent [19]

Mayer

[11] 4,443,562

[45] Apr. 17, 1984

[54] METHOD AND APPARATUS FOR PRODUCING LIGHTWEIGHT CELLULAR MATERIALS AND STRUCTURAL ARTICLES

[76] Inventor: Karl M. Mayer, Immenhofen 55, 8951 Ruderatshofen, Fed. Rep. of Germany

[21] Appl. No.: 399,692

[22] Filed: Jul. 19, 1982

[30] Foreign Application Priority Data

Jul. 17, 1981 [DE] Fed. Rep. of Germany ....... 3128283

[51] Int. Cl.³ .............................................. C08J 9/30
[52] U.S. Cl. ...................................... 521/83; 521/65; 521/68; 521/70; 521/91; 521/134; 521/145; 524/2; 524/7
[58] Field of Search .................... 524/7, 2; 521/65, 68, 521/70, 83, 91, 145, 134

[56] References Cited

U.S. PATENT DOCUMENTS

| | | | |
|---|---|---|---|
| 3,141,857 | 7/1964 | Sommer | 521/83 |
| 3,711,431 | 1/1973 | Vargiu | 521/83 |
| 3,775,351 | 11/1973 | Sachs | 521/83 |
| 4,057,526 | 11/1977 | de Rook | 521/83 |

*Primary Examiner*—Morton Foelak

[57] ABSTRACT

A process for making a lightweight structural member or insulating coating uses an initial mixture of hydrated lime, a dispersible additive, rock wool and, optionally an aggregate. This mixture has added to it water, and the water/solids mixture is agitated at high speed to produce a castable slurry having 60–80 volume percent air bubbles. The mixing is desirably conducted in a mixer having a cylindrical chamber and using paddles which rotate about their own axis and wherein there is movement of the chamber wall relative thereto, and the blades desirably scrape the chamber wall during such relative rotation.

13 Claims, 5 Drawing Figures

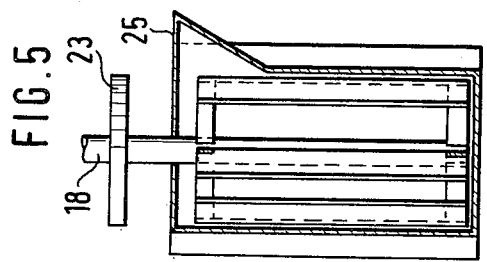
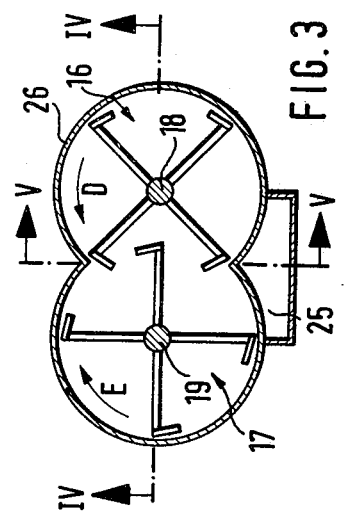
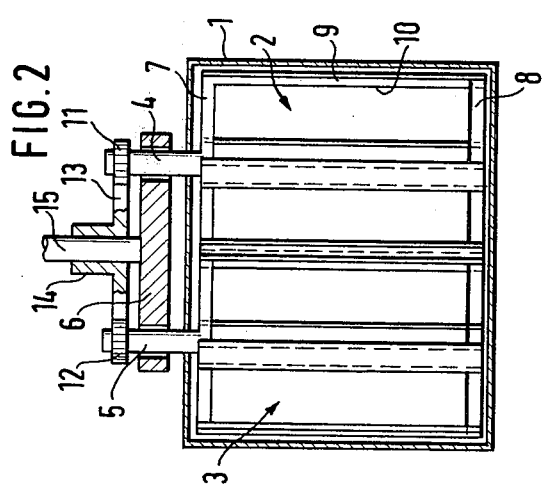
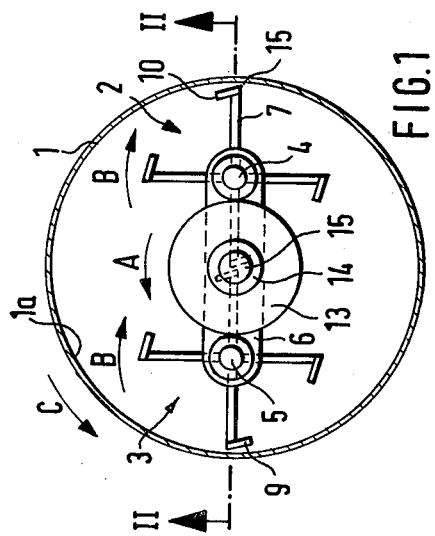

METHOD AND APPARATUS FOR PRODUCING LIGHTWEIGHT CELLULAR MATERIALS AND STRUCTURAL ARTICLES

BACKGROUND OF THE INVENTION

This invention is directed to a process for the preparation of a material for the production of lightweight building blocks, lightweight walls, lightweight structural panels, heat barrier coatings, and paved flooring, with high heat and noise insulating value and with the necessary strength.

Processes for making lightweight structural panels are known in which the ceramic material is based upon lime or lime-gypsum, and produces building blocks and other structural materials which have a low weight relative to volume and which exhibit improved noise and heat insulating properties in comparison with traditional materials. Heat insulating coatings based on plastics to provide improved heat insulating properties to structural members are known. However, in each of these prior processes, relatively high manufacturing cost is a drawback.

It is an object of the present invention to provide a novel process for the preparation of a novel ceramic material used in the production of lightweight building blocks, lightweight walls, and lightweight structural panels, and in producing heat-insulating coatings.

It is also an object to provide such a process for the production of these structural members which can be carried out at low cost and in which the structural members produced will exhibit the necessary strength and desirable insulating properties against noise and heat.

SUMMARY OF THE INVENTION

It has now been found that the foregoing and related objects can be readily attained in a method in which there are introduced into a mixing chamber, hydrated lime in an effective amount up to 80 volume percent, aggregate in an amount up to 50 volume percent, dispersible additive in an effective amount up to 15 volume percent, and rock wool in an effective amount up to 50 volume percent, all volume percentages being based upon the total volume of this initial mixture. Thereafter, water in an effective amount of up to 50 volume percent of the resultant mixture is introduced into the initial mixture, and the entire mixture is admixed at a high speed to produce, within a period of 30 to 90 seconds, a slurry containing 60–80 volume percent air bubbles. This slurry is then molded into lightweight structural articles or coated on preformed articles and surfaces as desired.

BRIEF DESCRIPTION OF THE DRAWINGS

FIG. 1 is a top view of a mixing apparatus used in the practice of the present invention;

FIG. 2 is a sectional view along the line II—II of FIG. 1;

FIG. 3 is top view of another embodiment of mixing apparatus for the practice of the present invention;

FIG. 4 is a sectional view along the line IV—IV of FIG. 3;

FIG. 5 is a sectional view along the line V—V of FIG. 3.

DETAILED DESCRIPTION OF THE PREFERRED EMBODIMENTS

Cement, rock, flour, ground quartz or gypsum are preferred as the aggregate.

Dispersible powders and air-pore formers available on the market, are suitable additives. Preferably used are dispersible powders (a) sold under the trade name LT 338 and comprising vinyl acetate, vinyl chloride, and vinyl laurate; (b) sold under the trade name RE530Z and comprising a copolymer of vinyl acetate with vinyl alcohol as a protective colloid; and (c) sold under the trade name RE526Z and comprising an interpolymer of vinyl acetate, vinyl chloride, and ethylene. Also useful as an additive is an air-pore former or foaming agent available under the trade name HOSTAPUR OSB from Hoechst AG of Frankfurt, Germany. Another additive which can be used in the preparation pursuant to the invention is a waterproofing additive distributed under the trade name WASAGESTER 15 by W.N.C. Nitrochemie, Aschau, Germany. Other dispersible additives can comprise inorganic materials such as titanium dioxide, which is sold under the trade name RFDI by Bayer AG, of Germany.

The benefit of the process pursuant to the present invention results from the fact that the dry material fed into the mixing chamber which has a large percentage of entrained air, is rapidly mixed with additional air from the atmosphere by a mixer operating at high speed in the mixing chamber, so that, depending on the time of mixing which is chosen previously according to the particular requirements, a foamy slurry with a high volume content of air bubbles is formed. After removal and further processing to make lightweight building blocks and the like, this slurry will produce a final product with high noise and heat insulating properties.

The addition of rock wool, which in the past has not been possible in practice, is of particular importance here. The rock wool gives the finished product high strength and dimensional stability despite a high proportion of air in it (up to 80 volume percent) so that lightweight building blocks can be made even in large dimensions. The rock wool component also effectively suppresses the shrinkage normally resulting from the drying or curing of the molded or cast product. Furthermore, the manufacturing costs of the finished products are substantially lower, particularly because of the lower material consumption, per cubic meter of volume, in the lightweight building blocks and construction panels, etc.

Another benefit of the material prepared pursuant to the invention and of the building products produced from this material, in comparison with traditional plastic building materials and/or chemically foamed building products, is found in the particularly desirably avoidance of possible injury to health. It is known that there may be health-related objections to the use, for example, of plastics containing plasticizers and solvents in residential areas or the like, since such plasticizers and solvents in low concentrations may tend to be released into the air or exude to the surface and exert harmful effects on living organisms by inhalation or by contact.

In accordance with a preferred embodiment of the process pursuant to the invention, the mixture to be foamed in the mixing chamber is 80 volume percent lime, 5 volume percent of a dispersible resin powder sold under the trade name LT 338 and comprising an interpolymer of vinyl acetate, vinyl chloride and vinyl laurate, 2 volume percent of a dispersible powder sold under the trade name RE530Z and comprising a copolymer of vinyl acetate with vinyl alcohol as a protective colloid, 2 volume percent of a dispersible powder sold under the trade name RE526Z and comprising an interpolymer of vinyl acetate, vinyl chloride and ethylene, 2 volume percent of an air-pore former, and 10 volume percent of rock wool.

The Mixing Apparatus

The high-speed mixer desirably has at least one mixing paddle which both rotates around its own axis and also moves eccentrically on a circular path around the central axis of the cylindrical mixing chamber or relative to the axis of the mixing chamber in which it is located. The mixing chamber itself may rotate around its central axis or it may be stationary. The dimensions of the mixing paddle(s) or blade(s) and of the mixing chamber are appropriately chosen so that the mixing paddle(s) scrapes the inner wall of the mixing chamnber with its side edges as it rotates. As it has been found, this produces a particularly uniform mixing together with incorporation of a high proportion of air. If the mixing is carried out for about 60 seconds, a hydrated lime foam slurry is obtained which contains approximately 70 volume percent of air bubbles. This foamed lime slurry can be poured into molds to make the lightweight building blocks or walls with both high noise and high heat insulating values.

It has also been found to be beneficial to use a tilted, rotating drum to provide the mixing chamber, and into which the water is introduced, and also to use two counterrotating mixing paddles for a mixing period of 30 to 90 seconds to produce the foam. This material when removed and processed has an air bubble content of 60–80 volume percent.

Preferably, the one or two mixing paddles should rotate at high speeds of up to 500 revolutions per minute.

Turning now to FIG. 1 of the drawings, the apparatus of this embodiment utilizes a cylindrical mixing chamber 1, in which are disposed two mixing paddles 2 and 3 which are inserted from the top. The shafts 4 and 5 for the paddles 2 and 3 extend upwardly of the mixing chamber 1 and are supported for rotation (in a manner not shown) in a yoke 6.

Each mixing paddle 2 and 3 has four mixing blades, which are best seen in the top view of FIG. 1. Each mixing blade consists of an upper crosspiece 7 and a lower crosspiece 8, which are best seen in FIG. 2 and which extend essentially radially from their associated shaft 4, 5. The free ends of the crosspieces 7 and 8 are connected together by a vertical longitudinal bridge member 9 which projects from the plane of the crosspieces 7 and 8 in the circumferential direction of the mixing chamber 10 to provide a hook-shaped configuration for the ends of the paddles. The bridge members 9 preferably have their free edges 10 displaced slightly radially inwardly towards the shaft 4.

The free ends of the shafts 4 and 5 of the mixing paddles 2 and 3 have running pinions 11 and 12 which mate with a coaxially arranged drive gear 13. This drive gear 13 has a collar 14 which is supported on a coaxial support 15 rigidly connected to the yoke 6 and which is designed as an axle in the embodiment shown.

During operation of this embodiment, the drive gear 14 is driven by drive means (not shown) to rotate around the axle 15. The two shafts 4, 5 with the associated mixing paddles 2 and 3 each rotate in opposite directions relative to one another, depending on the direction of rotation of the drive gear 13. The radially outermost edge 15 of each bridge member 9 then scrapes the inner wall 1a of the mixing chamber 1 as the axle 15 is driven in the clockwise or opposite direction so that the shafts 4, 5 rotate around the axle 15 on a common circular path.

Since the principal concern is to produce relative rotation between the mixing paddles 2 and 3 and the inner wall 1b of the mixing chamber 1, in an alternate embodiment (not shown), the mixing chamber itself can be rotated coaxially around the axel 15, in a manner not shown, in one or the other direction of rotation, while the yoke 6 remains stationary.

In FIG. 1, there is illustrated diagramatically the rotation of the drive gear 13 in the counterclockwise direction of the arrow A with rotation of the mixing paddles 2 and 3 in the clockwise direction of the arrow B and rotation of the mixing chamber 1 in the direction of the arrow C.

Turning now to the embodiment shown in FIGS. 3 through 5, two mixing paddles 16 and 17 are illustrated which correspond functionally to the mixing paddles 2 and 3 in the first embodiment shown in FIGS. 1 and 2. These mixing paddles have shafts 18 and 19 with mixing blades which have crosspieces 20 and 21 and vertical connecting bridge members 22. As is readily seen, the drive of the two shafts 18 and 19 of the mixing paddles 16 and 17 occurs through two pinions 23 and 24 mating with one another so that they must always rotate in directions opposite to one another and therefore can rotate with one another in the manner seen in FIG. 3. In the diagrammatic illustration, the shaft 18 rotates counterclockwise in the direction of the arrow D, while the shaft 19 rotates clockwise in the direction of the arrow E.

As seen in FIG. 5, the mixing chamber has a hopper 25 for the introduction of the materials to be mixed. As seen in FIG. 3, the outline of the mixing chamber 26 in this embodiment represents the envelope of rotation of the two mixing paddles 16 and 17 in a mathematical sense, so that this mixing chamber 26 has a cross section which appears to be composed of two intersecting cylinders.

Because of the overlapping or mating of the two mixing paddles 16 and 17, an intensification of the mixing occurs in this embodiment, which intensification is more obscured in the first embodiment illustrated in FIGS. 1 and 2 by the additional relative motion between the mixing chamber and the shafts of the mixing paddles. It should also be pointed out that the U-shaped design of the arms 7, 8, 9 and of the arms 20, 21 and 22 of the respective mixing paddles 2, 3 and 16, 17 results in a substantial distance between the vertical bridge members 9 and 22 and the respective shafts 4, 5 or 18, 19. As a result, there is a turbulent passage provided between the particular bridge member and associated shaft, which contributes substantially to the improvement in the mixing and particularly to the incorporation or entrapment of air for purposes of foam formation. This is also true for the hook-shaped cross section provided by the vertical bridge member 9 or 22 and the respective horizontal arms 7, 8 and 20, 21. Moreover, the vertical bridge members 9 and 20 differ in each case in the direction of rotation and project opposite to it in the circumferential direction.

Specific Mixtures

A second useful mixture in accordance with the present invention comprises 40 volume percent white hydrated lime; 20 volume percent cement; 10 volume percent black lime; 10 volume percent rock flour; 6 volume percent of a dispersible powder sold under the trade name LT 338 and comprising an interpolymer of vinyl acetate, vinyl chloride and vinyl laurate; 2 volume percent of a dispersible polymer sold under the trade name RE530Z and comprising a copolymer of vinyl acetate with vinyl alcohol as a protective colloid; 2 volume percent of a dispersible powder sold under the trade name RE526Z and comprising an interpolymer of vinyl acetate, vinyl chloride and ethylene; 2 volume percent of a foaming agent; and 5-10 volume percent of rock wool. These components are placed in the mixing chamber and stirred to produce a foam slurry which has a high proportion of air. The foamed mixture produced can be processed to form exterior or interior walls which have both high noise and high heat insulating values as well as high strength.

A third useful mixture is one which comprises 40 volume percent white hydrated lime; 40 volume percent cement; 6 volume percent dispersible powder sold under the trade name LT 338 and comprising an interpolymer of vinyl acetate, vinyl chloride and vinyl laurate; 3 volume percent of dispersible powder sold under the trade name RE530Z and comprising a copolymer of vinyl acetate with vinyl alcohol as a protective colloid; 2 volume percent of a dispersible powder sold under the trade name RE526Z and comprising a interpolymer of vinyl acetate, vinyl chloride and ethylene; 1 volume percent of a foaming agent; and 5-10 volume percent rock wool.

A fourth mixture is one comprising in which 50 volume percent of hydrated lime; 20 volume percent cement; 2 volume percent air pore former; up to 10 volume percent of dispersible powder sold under the trade name LT 338 and comprising an interpolymer of vinyl acetate, vinyl chloride, and vinyl laurate; and 5-10 volume percent rock wool.

A fifth exemplary mixture is one comprising 50 volume percent gypsum; 5-10 volume percent rock wool; 30 volume percent hydrated lime; and 10 volume percent additive. This will produce a foamed composition which is well suited for the production of insulating panels to reduce heat and noise, as well as for the production of plaster to be applied to interior walls.

For use in the process pursuant to the invention, it is preferred to use a rock wool which has been produced from quartz sand and/or basalt rock. If so desired, the mixture may include waterproofing additives, such as the previously mentioned WASAGESTER 15, so that the finished building panels or blocks have water-repellant properties.

What is claimed as the invention is:

1. In a process for making a ceramic material for the production of lightweight structural members and coatings having high heat and noise insulating values, the steps comprising:
    A. introducing into a mixing chamber (i) hydrated lime in an effective amount up to 80 volume percent; (ii) an additive in an effective amount up to 15 volume percent, said additive being selected from the group consisting of interpolymers of vinyl acetate, vinyl chloride and vinyl laurate; copolymers of vinyl acetate and vinyl chloride; interpolymers of vinyl acetate, vinyl chloride and ethylene; and mixtures thereof; (iii) rock wool in an effective amount up to 50 volume percent; and (iv) up to 50 volume percent aggregate;
    B. introducing into the initial mixture in the chamber water in an effective amount up to 50 volume percent; and
    C. mixing at high speed the water/solids mixture to produce within 30-90 seconds a foamed mixture having air bubbles comprising 60-80 volume percent thereof.

2. The process in accordance with claim 1 wherein the mixture of Step A comprises:
    (i) about 80 volume percent lime; (ii) about 5 volume percent of dispersible powdered interpolymer of vinyl acetate, vinyl chloride and vinyl laurate; (iii) about 2 volume percent of a dispersible powder copolymer of vinyl acetate and vinyl alcohol; (iv) about 2 volume percent of a dispersible powder interpolymer of vinyl acetate, vinyl chloride and ethylene; (v) about 2 volume percent of an air pore former; and (vi) about 10 volume percent of rock wool.

3. The process in accordance with claim 1 wherein the mixture of Step A comprises:
    (i) about 40 volume percent of white hydrated lime; (ii) about 20 volume percent cement; (iii) about 10 volume percent black lime; (iv) about 10 volume percent rock flour; (v) about 6 volume percent of dispersible powder interpolymer of vinyl acetate, vinyl chloride, and vinyl laurate; (vi) about 2 volume percent of a dispersible powder copolymer of vinyl acetate and vinyl alcohol as a protective colloid; (vii) about 2 volume percent of a dispersible powder interpolymer of vinyl acetate, vinyl chloride, and ethylene; (viii) about 2 volume percent of air pore former; and (ix) about 5-10 volume percent rock wool.

4. The process in accordance with claim 1 wherein the mixture of Step A comprises:
    (i) about 40 volume percent of white hydrated lime; (ii) about 40 volume percent cement; (iii) about 6 volume percent of dispersible powder interpolymer of vinyl acetate, vinyl chloride, and vinyl laurate; (iv) about 3 volume percent of dispersible powder copolymer of vinyl acetate and vinyl alcohol as a protective colloid; (v) about 2 volume percent of dispersible powder interpolymer of vinyl acetate, vinyl chloride, and ethylene; (vi) about 1 volume percent of air pore former; and (vii) about 5-10 volume percent rock wool.

5. The process in accordance with claim 1 wherein the mixture of Step A comprises:
    (i) about 50 volume percent hydrated lime; (ii) about 20 volume percent cement; (iii) about 2 volume percent of air pore former; (iv) up to 10 volume percent of dispersible powder interpolymer of vinyl acetate, vinyl chloride, and vinyl laurate; and (v) about 5-10 volume percent rock wool.

6. The process in accordance with claim 1 wherein the mixture of Step A comprises:
    (i) about 50 volume percent gypsum; (ii) about 5-10 volume percent rock wool; (iii) about 30 volume percent hydrated lime; and (iv) about 10 volume percent of additive.

7. The process in accordance with any one of claims 1 through 6, wherein the rock wool is produced from a material selected from the group consisting of quartz sand and basalt rock.

8. The process in accordance with any one of claims 1 through 7 wherein there is additionally included at least one additive selected from the group consisting of a waterproofing agent and titanium dioxide.

9. The process in accordance with claim 1 wherein said chamber is a cylindrical chamber of a higher speed mixer which has at least one mixing paddle which rotates and wherein said mixing step utilizes a mix and paddle which rotates around its own axis and concurrently moves eccentrically in a circular path around the central axis of said cylindrical mixing chamber to produce relative to the wall of said chamber.

10. The process in accordance with claim 9 wherein said mixing paddle scrapes the wall of the cylindrical mixing chamber as it moves relative thereto.

11. The process in accordance with claims 6 and 9 or claims 6 and 10 in which the mixing chamber is an inclined rotating drum and wherein said mixing step is conducted with two counterrotating mixing paddles for a mixing time of 30–90 seconds to produce an aerated material with an air volume of 60–80 percent.

12. The process in accordance with any one of claims 1, 9, 10 and 11 in that said mixing step is provided by a mixing paddle which rotates at a speed of rotation of 300 to 500 revolutions per minute.

13. The process in accordance with any one of claims 9, 10, 11 and 12, wherein each said mixing paddle has at least two mixing blades.

* * * * *